US012756429B2

(12) United States Patent
Singh et al.

(10) Patent No.: US 12,756,429 B2
(45) Date of Patent: Oct. 6, 2026

(54) SYSTEM AND METHOD FOR ENHANCING WIRELESS COVERAGE AT AN INFORMATION HANDLING SYSTEM USING A MULTI-SLICE STATIC METASURFACE

(71) Applicant: Dell Products LP, Round Rock, TX (US)

(72) Inventors: Tejinder Singh, Manotick (CA); Navjot Kaur Khaira, Manotick (CA); Harpreet S. Narula, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 8 days.

(21) Appl. No.: 19/078,094

(22) Filed: Mar. 12, 2025

(65) Prior Publication Data

US 2026/0280610 A1 Sep. 17, 2026

(51) Int. Cl.
*H04B 7/04* (2017.01)
*H01Q 1/22* (2006.01)
*H01Q 15/14* (2006.01)

(52) U.S. Cl.
CPC ....... *H04B 7/04013* (2023.05); *H01Q 1/2258* (2013.01); *H01Q 15/14* (2013.01)

(58) Field of Classification Search
CPC ................. H01Q 1/2258; H01Q 15/14; H04B 7/04013
USPC ........................................................ 375/267
See application file for complete search history.

(56) References Cited

U.S. PATENT DOCUMENTS

2017/0069967 A1* 3/2017 Shrekenhamer ......... H01Q 1/28
2024/0195071 A1* 6/2024 Kauser ............... H01Q 15/0086

* cited by examiner

*Primary Examiner* — Leila Malek
(74) *Attorney, Agent, or Firm* — Prol Intellectual Property Law, PLLC; H. Kenneth Prol

(57) ABSTRACT

A system and method for redirecting electromagnetic (EM) waves at an information handling system including a static metasurface unit cell array operatively coupled to a surface of the information handling system comprising a first subsection of metasurface unit cells of the static metasurface unit cell array to redirect incoming EM signals in a first direction along an azimuth, a second subsection of metasurface unit cells of the static metasurface unit cell array to redirect EM signals in a second direction along an azimuth, and a third or more subsections of metasurface unit cells of the static metasurface unit cell array to redirect incoming EM signals in a third or more directions along an azimuth, wherein the arrangement of the metasurface unit cells having varied EM signal phase shifting within each subsection determines constructive or destructive interference to generate the direction beam for redirecting the incoming EM signals by that subsection.

20 Claims, 11 Drawing Sheets

SYSTEM AND METHOD FOR ENHANCING WIRELESS COVERAGE AT AN INFORMATION HANDLING SYSTEM USING A MULTI-SLICE STATIC METASURFACE

FIELD OF THE DISCLOSURE

The present disclosure generally relates to enhancing wireless coverage systems at an information handling system. More specifically, the present disclosure relates to a metasurface unit cell array at an information handling system, such as a laptop, which employs phase cancellation techniques and adaptive attenuation amongst subsections of metasurface unit cells in an array to enhance wireless coverage using a multi-slice static metasurface.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. This may include wireless communications by information handling system via one or more wireless communication protocols. The information handling system may be used to execute instructions of a graphics processing unit to provide image and video data to the digital display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
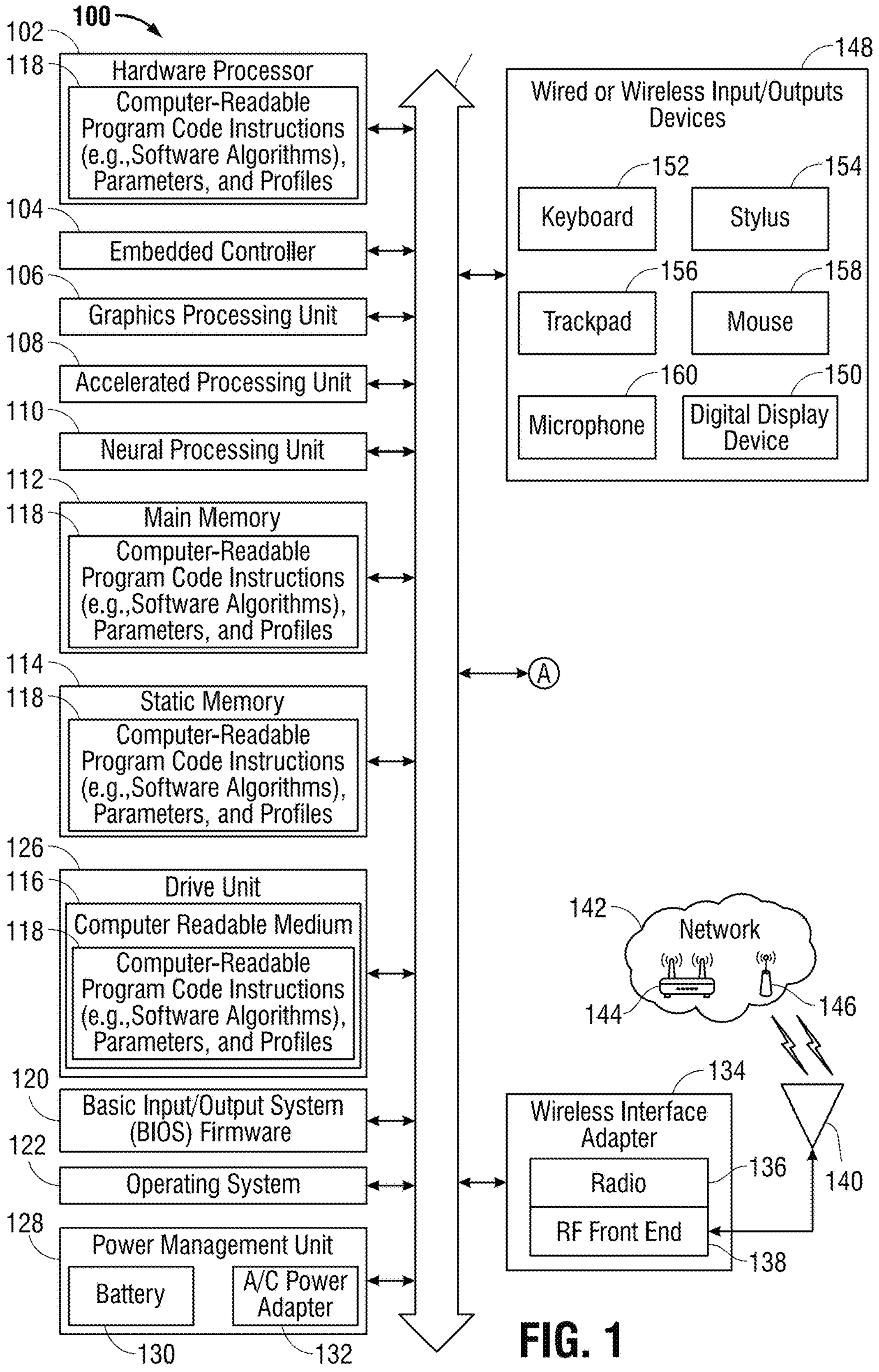
FIG. 1 is a block diagram illustrating an information handling system and a metasurface unit cell array comprising a plurality of subsections of static metasurface unit cells operatively coupled to a surface of the information handling system according to an embodiment of the present disclosure.
Figure 1:
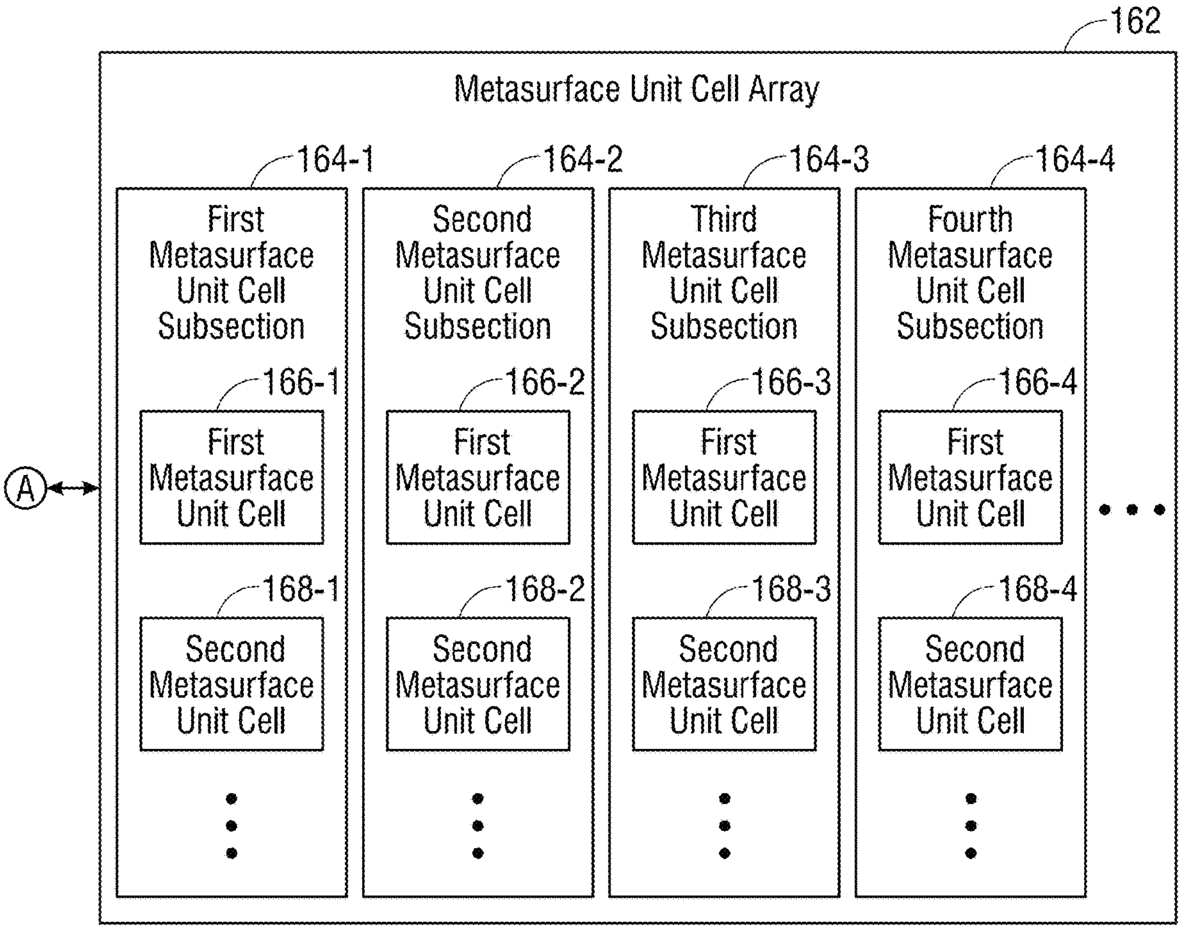

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Wireless data transmission from a transmitting device to a receiving device allows for rapid data transmission and communication between multiple devices. Devices may include wirelessly enabled information handling systems, access point devices, or any computing device, such as internet of things (IoT) devices that are wirelessly capable. As data transmission requirements increase, the electromagnetic (EM) wave (e.g., 5G technologies using 20 to 50 GHz wireless signals or other frequencies, or WiFi 6 signals at 2.4 GHz, 5 GHz or even 6 GHz) used to transmit these ever-increasing amounts of data are shortened or may benefit from extended range. Extending wireless transmission range is especially difficult in areas where dense wireless communications occur such as locations where large numbers of users of information handling systems congregate such as in cafes or libraries. Adding to these wireless communication issues, laptop-type information handling systems, for example, have designs that inadvertently reflect, absorb, or scatter those wireless electromagnetic (EM) waves leading to additional wireless communication issues. Further, extending wireless transmission range may be impeded by environmental factors such as walls other structures of buildings or a radiofrequency environment having absorptive or scattering properties.

In an attempt to alleviate these wireless communication issues, some wireless communication technologists may install an additional number of routers, switches, or modems that extend the distance of wireless communication throughout an area. However, this increases the costs associated with creating a wireless communication network. Additionally, as the number of hardware components increase, the complexity of the wireless network also increases. Therefore, there is a need to optimize wireless communications within a wireless network with each laptop-type information handling system interacting with those EM waves from an access point such that their interaction may optimize their own wireless performance and coexist seamlessly in a wireless-rich environment.

The present specification, therefore, describes an information handling system that includes a static metasurface unit cell array operatively coupled to the surface of the information handling system according to embodiments herein. This surface may include a static metasurface unit cell array coupled to lid of a laptop. This allows the static metasurface unit cell array to interact with those EM waves from, for example, an access point when the user has opened the lid of the laptop. In an embodiment, the static metasurface unit cell array may be divided or otherwise segmented into a plurality of subsections of metasurface unit cells with each of these subsections of metasurface unit cells being used to redirect incoming EM waves in one of a plurality of horizontal and/or vertical direction beams. In an embodiment, the static metasurface unit cell array may include a first subsection of metasurface unit cells of the static metasurface unit cell array to redirect incoming EM signals in a first direction beam along an azimuth. An azimuth may be a horizonal, vertical or combination direction and is not necessarily tied to any compass direction in embodiments herein. In an embodiment the static metasurface unit cell array may include a second subsection of metasurface unit cells of the static metasurface unit cell array to redirect EM signals in a second direction beam along an azimuth. In an embodiment, the static metasurface unit cell array may include a third subsection of metasurface unit cells of the static metasurface unit cell array to redirect incoming EM signals in a third direction beam along an azimuth. In an embodiment, the static metasurface unit cell array may include a fourth subsection or additional subsections of metasurface unit cells of the static metasurface unit cell array to redirect incoming EM signals in a fourth or other direction beams along an azimuth. Thus, in an embodiment, the static metasurface unit cell array may be segregated or divided into four our more distinct subsections of metasurface unit cells the redirect the incoming EM waves in a specific direction using beamforming principles. Any number of subsections of metasurface unit cells are contemplated among the static metasurface unit cell array in embodiments herein.

It is appreciated that, in some embodiments, the static metasurface unit cell array may include more than four subsections of metasurface unit cells. Thus, in another embodiment, the static metasurface unit cell array may include a fifth subsection of metasurface unit cells of the metasurface unit cell array to redirect incoming EM signals in a fifth direction beam along an azimuth and a sixth subsection of metasurface unit cells of the metasurface unit cell array to redirect incoming EM signals in a sixth direction beam along an azimuth. The number of subsections of metasurface unit cells created within the static metasurface unit cell array may be selected with other considerations in mind such as desirability of multiple direction beams which may include a tradeoff of the gain possible for each direction beam due to the number of unit cells available within each subsection of metasurface unit cells, among other considerations.

In an embodiment, for example, where the static metasurface unit cell array is divided into six subsections of the metasurface unit cells, the first subsection of the metasurface unit cells of the metasurface unit cell array may be used to redirect the incoming EM signals in a direction beam between −120° to −80° along the azimuth. In this embodiment, the second subsection of the metasurface unit cells of the metasurface unit cell array may be used to redirect the incoming EM signals in a direction beam between −80° to −40° along the azimuth. Additionally, in this embodiment, the third subsection of the metasurface unit cells of the metasurface unit cell array may be used to redirect the incoming EM signals in a direction beam between −40° to 0° along the azimuth. In this embodiment, the fourth subsection of the metasurface unit cells of the metasurface unit cell array may be used to redirect the incoming EM signals in a direction beam between 0° to 40° along the azimuth, the fifth subsection of the metasurface unit cells of the metasurface unit cell array may be used to redirect the incoming EM signals in a direction beam between 40° to 80° along the azimuth, and the sixth subsection of the metasurface unit cells of the metasurface unit cell array may be used to redirect the incoming EM signals in a direction beam between 80° to 120° along the azimuth.

In another example embodiment where the static metasurface unit cell array is divided into four subsections of the metasurface unit cells, the first subsection of the metasurface unit cells of the static metasurface unit cell array may be used to redirect the incoming EM signals in a direction beam between −120° to −60° along the azimuth. In this embodiment, the second subsection of the metasurface unit cells of the static metasurface unit cell array may be used to redirect the incoming EM signals in a direction beam between −60° to 0° along the azimuth. In this embodiment, the third subsection of the metasurface unit cells of the static metasurface unit cell array may be used to redirect the incoming EM signals in a direction beam between 0° to 60° along the azimuth. Additionally, in this embodiment, the fourth subsection of the metasurface unit cells of the static metasurface unit cell array may be used to redirect the incoming EM signals in a direction beam between 60° to 120° along the azimuth.

In one embodiment, the metasurface unit cells of the static metasurface unit cell array may each include a plurality of concentric metal resonators formed around a central metal dot or node with the arrangement and number of concentric metal resonators defining the phase shifting of the incoming EM signals at each metasurface unit cell and among the plurality of metasurface unit cells in a subsection of unit cells of the metasurface unit cell array. These plurality of concentric metal resonators formed around a central metal dot or node with the arrangement and number of concentric metal resonators among the unit cells in a subsection of unit cells in the metasurface unit cell array redirect the EM signals in a first direction beam for that subsection of unit cells in an embodiment. Similarly, the plurality of concentric metal resonators formed around a central metal dot or node with the arrangement and number of concentric metal resonators for unit cells in the second, third or fourth subsection of metasurface unit cells determines the second direction beam, the third direction beam, the fourth direction beam, or other direction beams respectively across one or more directional azimuths of the static metasurface unit cell array surface. In an embodiment, a distance between each of the subsections of neighboring metasurface unit cells may be created such that this distance is at least a length of two metasurface unit cells within the static metasurface unit cell array such that more distinct directional beams are formed between the plural subsections of unit cells in the static metasurface unit cell array.

Thus, the presently-described metasurface unit cell array of embodiments herein provides directional signal enhancement by precisely redirecting enhanced EM waves without the need for electronic components or complex software algorithms. Still further, the static metasurface unit cell array may be a low-cost and maintenance free solution that makes the static metasurface unit cell array ideal for widespread deployment. This static metasurface unit cell array may be easily integrated into existing laptop designs without limited additional cost or complexity thereby providing a long-term enhancement to wireless connectivity without the need for updates or active management. Still further, the static metasurface unit cell array offers enhanced coexistence with passive collaboration among the information handling systems so that signal strength is enhanced and network reliability for each information handling system can leverage the presence of multiple laptops in order to enhance the network coverage in embodiments herein.

Turning now to the figures, FIG. 1 illustrates an information handling system 100 similar to the information handling systems according to several aspects of the present disclosure that may operate as a source or target radiofrequency device for use with the reconfigurable metasurfaces of the embodiments of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system within a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be accessible by hardware processing resources using that main memory 112. Computer-readable program code instructions stored in static memory 114, main memory 112, or drive unit 126 may be involved in invoking such computer-readable program code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a mouse 158, a trackpad 156, a stylus 154, a keyboard 152, a digital display device 150, a microphone 160, or any combination thereof. Portions of an information handling system 100 may themselves be considered information handling systems 100.

Information handling system 100 may include devices or modules that embody one or more of the devices or execute instructions for one or more systems and modules. The information handling system 100 may execute computer-readable program code instructions (e.g., software algorithms) parameters, and profiles 118 that may operate on servers or systems, remote data centers, or on-box in individual client information handling systems according to various embodiments herein. In some embodiments, it is understood any or all portions of computer-readable program code instructions (e.g., software algorithms) parameters, and profiles 118 may operate on a plurality of information handling systems 100.

The information handling system 100 may include the hardware processor 102 such as a central processing unit (CPU) or other hardware processing resource (e.g., 104, 106, 108, 110). Any of the hardware processing resources may operate to execute computer readable code instructions that are either firmware or software code, such as those software systems and modules described herein. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with computer readable medium 116 storing computer-readable program code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a keyboard 152, a mouse 158, digital display device 150, stylus 154, trackpad 156, microphone 160, among other peripheral devices.

The information handling system 100 further includes a digital display device 150. The digital display device 150 in an embodiment may function as a liquid crystal display (LCD), an organic light emitting diode (OLED), a flat panel display, or a solid-state display. It is appreciated that the digital display device 150 may be wired or wireless and may be an external digital display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a keyboard 152, among others that allows the user to interface with the information handling system 100 via the digital display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein. The present specification contemplates that the wired or wireless I/O devices 148 may be wired or wireless.

A network interface device of the information handling system 100 may be wired or wireless such as shown with wireless interface adapter 134 that can provide wireless connectivity among plural devices such as with Bluetooth® or to a network 142 such as with a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and one or more antennas 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems. In the context of the present disclosure the one or more antennas 140 may include one or more WiFi antennas operating at 2.4 GHz, 5 GHZ, and/or 6 GHz frequencies, one or more Bluetooth antennas, and one or more 5G new radio (5G-NR) antennas that operate at Frequency Range 1 (FR1) (which includes sub-7 GHz frequency bands and those from 410 MHz to 7125 MHz0 and Frequency Range 2 (FR2) (which includes frequency bands from 24.25 GHz to 71.0 GHz frequency bands).

In other embodiments, the wireless interface device 134 with its radio 136, RF front end 138 and antennas 140 are used to communicate with a WWAN or and WLAN which may each include an AP 144 or base station 146 used to operatively couple the information handling system 100 to a network 142 via the wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more radiofrequency (RF) subsystems (e.g., radio 136) with transmitter/receiver circuitry, modem circuitry, one or more antenna RF front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols. The receiver device 178 may be any other device and may include the AP 144, the base station 146, or any other computing device described herein. Additionally, the information handling system 100 and receiver device 178 may be capable of transmitting wireless data using, for example, EM waves that include 5G mm wave lengths such as those included within the 20-50 GHz range or WiFi wavelengths such as 2.4 GHz, 5 GHZ, 6 GHz or others to be used with later versions of WiFi.

In an embodiment, the wireless interface adapter 134 may operate in accordance with any wireless data communication standards. To communicate with a wireless local area network and/or the receiver device 178, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes computer-readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit (ASIC). Accordingly, the present system encompasses a hardware processing resource executing computer-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable program code instructions, parameters, and profiles 118 or receives and executes computer-readable program code instructions, parameters, and profiles 118 responsive to a propagated signal, so that a hardware device connected to a network 142 may communicate voice, video, or data over the network 142. Further, the computer-readable program code instructions, parameters, and profiles 118 may be transmitted or received over the network 142 via the network interface device or wireless interface adapter 134.

The information handling system 100 may include a set of computer-readable program code instructions, parameters, and profiles 118 that may be executed to cause the computer system to perform any one or more of the methods or computer-based functions disclosed herein. For example, computer-readable program code instructions, parameters, and profiles 118 may be executed by a hardware processor 102, GPU 106, EC 104, APU 108, NPU 110, or any other hardware processing resource and may include software agents, or other aspects or components used to execute the methods and systems described herein. Various software modules comprising application computer-readable program code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, the video/graphic display device 150, or other wired or wireless I/O devices 148 such as the mouse 158, the stylus 154, the keyboard 152, and the trackpad 156 and other components that may require power when a power button has been actuated by a user. In an embodiment, the PMU 128 may monitor power levels and be electrically coupled to the information handling system 100 in embodiments herein to provide this power. The PMU 128 may be coupled to the bus

124 to provide or receive data or machine-readable code instructions. The PMU 128 may regulate power from a power source such as the battery 130, or AC power adapter 132. In an embodiment, the battery 130 may be charged via the AC power adapter 132 and provide power to the components of the information handling system 100, via wired connections, or when AC power from the AC power adapter 132 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 116 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may include a static metasurface unit cell array 162. In an embodiment, the metasurface unit cell array 162 may be affixed to a display chassis cover of the laptop-type information handling system 100 such as the A-cover of a laptop type information handling system or the back of a tablet type information handling system. The A-cover may include a top portion or back portion lid of a display chassis of the laptop-type information handling system 100 housing an integrated digital display device 150, for example. The placement of the metasurface unit cell array 162 on the A-cover of the laptop-type information handling system 100 or the back of a tablet-type information handling system 100 may allow for the enhancement of wireless coverage within an area. As described herein, the metasurface unit cell array 162 may be used to redirect incoming electromagnetic (EM) waves with enhancements of those signals to extend the wireless coverage of a network device such as an AP 144 or a base station 146.

In an embodiment, the metasurface unit cell array 162 may be segregated or otherwise divided into a plurality of metasurface unit cell subsections containing one or more metasurface unit cells. As shown in one embodiment of FIG. 1, the metasurface unit cell array 162 may be divided into four metasurface unit cell subsections that includes a first metasurface unit cell subsection 164-1, a second metasurface unit cell subsection 164-2, a third metasurface unit cell subsection 164-3, and a fourth metasurface unit cell subsection 164-4. It is appreciated that this number of metasurface unit cell subsections shown in FIG. 1 is merely an example and the present specification contemplates that the metasurface unit cell array 162 may be divided into more or fewer than four metasurface unit cell subsections.

As shown in FIG. 1, each of the metasurface unit cell subsections 164-1, 164-2, 164-3, 164-4 may include a plurality of metasurface unit cells in embodiments herein. FIG. 1 shows, at least, plural first metasurface unit cells 166-1, 166-2, 166-3, 166-4 and plural second metasurface unit cells 168-1, 168-2, 168-3, 168-4 included in each of the metasurface unit cell subsections 164-1, 164-2, 164-3, 164-4 respectively. It is appreciated, however, that each of the metasurface unit cell subsections 164-1, 164-2, 164-3, 164-4 of the metasurface unit cell array 162 may each include more than the first metasurface unit cell 166-1, 166-2, 166-3, 166-4 and second metasurface unit cell 168-1, 168-2, 168-3, 168-4 shown in FIG. 1 and instead may include more than those shown. In an embodiment, the metasurface unit cell array 162 may include each of the metasurface unit cell subsections 164-1, 164-2, 164-3, 164-4 that includes an array of metasurface unit cells 166-1, 168-1, 166-2, 168-2, 166-3, 168-3, 166-4, 168-4 respectively arranged in rows and columns. It is appreciated, however, that any arrangement and any number of metasurface unit cells 166-1, 166-2, 166-3, 166-4, 168-1, 168-2, 168-3, 168-4 may be used to form the metasurface unit cell array 162 described herein. As described herein, the metasurface unit cell array 162 is a static metasurface unit cell array 162 that does not use power to reconfigure any of the metasurface unit cells 166-1, 166-2, 166-3, 166-4, 168-1, 168-2, 168-3, 168-4 such that the formation of the individual metasurface unit cells 166-1, 168-1, or others, 166-2, 168-2, or others, 166-3, 168-3, or others, and 166-4, 168-4 or others within each of the metasurface unit cell subsections 164-1, 164-2, 164-3, 164-4 respectively are formed to create differences in the redirection phase of the EM wave to beamform the redirected EM wave in a specific direction beams that have a specified gain magnitude. Thus, in an embodiment each of the first metasurface unit cell 166-1 and second metasurface unit cell 168-1 of the first metasurface unit cell subsection 164-1, each of the first metasurface unit cell 166-2, second metasurface unit cell 168-2 of the second metasurface unit cell subsection 164-2, each first metasurface unit cell 166-3 and second metasurface unit cell 168-3 of the third metasurface unit cell subsection 164-3, and each first metasurface unit cell 166-4 and second metasurface unit cell 168-4 of the fourth metasurface unit cell subsection 164-4, and other metasurface unit cells are formed to create a specific phase shifting that redirects incoming EM waves in different RF direction beams while also increasing setting gain of that EM wave using constructive and/or destructive interference principles among the plurality of metasurface unit cells 166-1, 166-2, 166-3, 166-4, 168-1, 168-2, 168-3, 168-4 within each of the metasurface unit cell subsections 164-1, 164-2, 164-3, 164-4.

In an embodiment, each of the metasurface unit cell subsections 164-1, 164-2, 164-3, 164-4 may be separated from each other by a distance such that the redirected EM waves do not interfere with each other. In a specific embodiment, the metasurface unit cell subsections 164-1, 164-2, 164-3, 164-4 may be separated from each neighboring metasurface unit cell subsection 164-1, 164-2, 164-3, 164-4 by at least a distance of a length of two metasurface unit cells 166-1, 166-2, 166-3, 166-4, 168-1, 168-2, 168-3, 168-4. Thus, in an embodiment, the metasurface unit cell array 162 shown in FIG. 1 may be used to redirect a single incoming EM wave in four distinct direction beams without each of the direction beams interfering with each other.

In a specific example embodiment, the four metasurface unit cell subsections 164-1, 164-2, 164-3, 164-4 may redirect the incoming EM wave in a specific direction or directional range. For example, the first metasurface unit cell subsection 164-1 of the static metasurface unit cell array 162 may redirect the incoming EM signals or waves in a first direction beam or directional range along an azimuth or an angular direction relative to a horizontal, vertical or other reference plane. An azimuth may be a horizonal, vertical or combination direction and is not necessarily tied to any compass direction in embodiments herein. Specifically, the first metasurface unit cell subsection 164-1 may redirect the EM wave between −120° to −60° along the azimuth. In this example embodiment, the second metasurface unit cell subsection 164-2 of the metasurface unit cell array 162 may redirect the EM wave in a second direction beam along an azimuth such as between −60° to 0° along the azimuth. Additionally, in this example embodiment, the third metasurface unit cell subsection 164-3 of the metasurface unit cell array 162 may redirect incoming EM waves in a third direction beam along the azimuth such as between 0° to 60° along the azimuth. Even further, the fourth metasurface unit cell subsection 164-4 of the metasurface unit cell array 162 may redirect incoming EM waves in a fourth direction beam along the azimuth such as between 60° to 120° along the azimuth. It is also appreciated that a vertical or elevational component of the directionality of the redirected EM wave may also be incorporated into one or more of the metasurface unit cell subsections 164-1, 164-2, 164-3, 164-4 such that the formation of the individual metasurface unit cells 166-1, 166-2, 166-3, 166-4, 168-1, 168-2, 168-3, 168-4 within each of the metasurface unit cell subsections 164-1, 164-2, 164-3, 164-4 can redirect the incoming EM waves up or down relative to the surface of the metasurface unit cell array 162 in embodiments herein. Further, combination vertical and horizontal components of the directionality of the redirected EM wave may also be incorporated into one or more of the metasurface unit cell subsections 164-1, 164-2, 164-3, 164-4 such that the formation of the individual metasurface unit cells 166-1, 166-2, 166-3, 166-4, 168-1, 168-2, 168-3, 168-4 within each of the metasurface unit cell subsections 164-1, 164-2, 164-3, 164-4 can redirect the incoming EM waves along such plurality of directions or direction combinations in other embodiments herein.

As described herein, the presently-described static metasurface unit cell array 162 of embodiments herein provides directional signal enhancement by redirecting enhanced EM waves in a selected array of directional beams without the need for electronic components or complex software algorithms. Still further, the static metasurface unit cell array 162 may be a low-cost and maintenance free solution that makes the static metasurface unit cell array 162 ideal for widespread deployment. This static metasurface unit cell array 162 may be easily integrated into existing laptop designs without significant cost or complexity thereby providing a long-term enhancement to wireless connectivity without the need for updates or active management. Still further, the static metasurface unit cell array 162 offers enhanced coexistence with passive collaboration among the information handling systems 100 so that signal strength is enhanced and network reliability for each information handling system 100 can leverage the presence of multiple laptops in order to enhance the network coverage.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
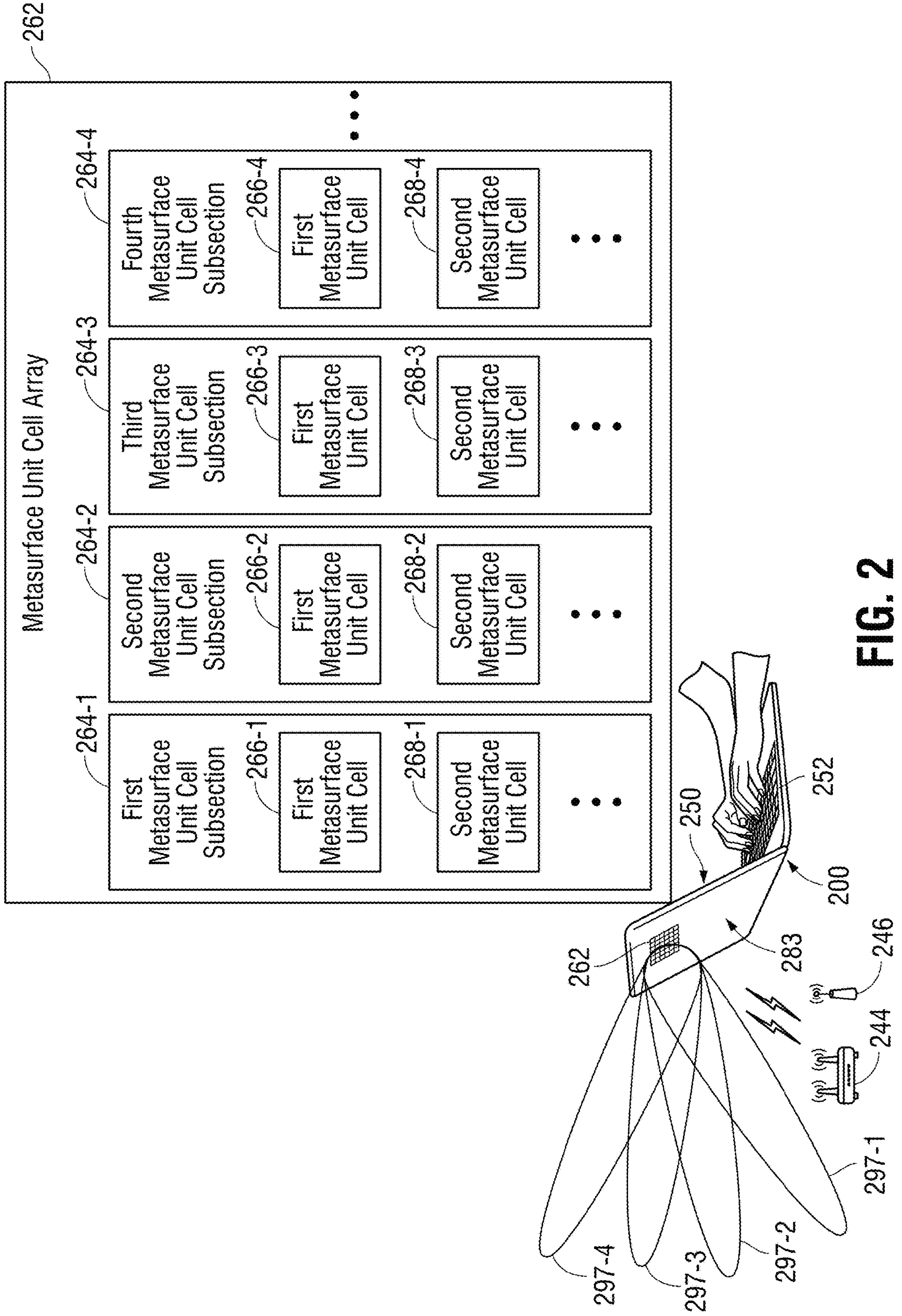
FIG. 2 is a block and graphic diagram illustrating an information handling system and a metasurface unit cell array comprising a plurality of subsections of static metasurface unit cells operatively coupled to a surface of the information handling system according to an embodiment of the present disclosure.

FIG. 2 is a block and graphic diagram illustrating an information handling system 200 and a metasurface unit cell array 262 comprising a plurality of static metasurface unit cells such as 266-1, 268-1, 266-2, 268-2, 266-3, 268-3, 266-4, 268-4 operatively coupled to a surface of the information handling system 200 according to an embodiment of the present disclosure. As described herein, the information handling system 200 may be a laptop-type information handling system 200 that includes a lid portion 283 of a display chassis. This lid portion 283 may be one location on the surface of the information handling system 200 where the metasurface unit cell array 262 may be placed. In an embodiment, the individual static metasurface unit cells such as 266-1, 268-1, 266-2, 268-2, 266-3, 268-3, 266-4, 268-4 of the metasurface unit cell array 262 may be formed directly on the surface of the lid portion 283. In another embodiment, the metasurface unit cell array 262 may include a substrate onto which the static metasurface unit cells such as 266-1, 268-1, 266-2, 268-2, 266-3, 268-3, 266-4, 268-4 are placed on and the metasurface unit cell array 262 may be affixed to the surface of the lid portion 283. In yet another example embodiment, the metasurface unit cell array 262 may be formed into a protective case which may be coupled to or embedded into the lid portion 283.

As shown in FIG. 2, the laptop-type information handling system 200 includes a keyboard 252 for the user to provide input to the information handling system 200. Still further, the information handling system 200 may include a digital display device 250 for the user to be presented with visual output from the information handling system 200.

In an embodiment, the metasurface unit cell array 262 may be segregated or otherwise divided into a plurality of metasurface unit cell subsections such as 264-1, 264-2, 264-3, 264-4 or others. Similar to FIG. 1, FIG. 2 shows the metasurface unit cell array 262 may be divided into four metasurface unit cell subsections that includes a first metasurface unit cell subsection 264-1, a second metasurface unit cell subsection 264-2, a third metasurface unit cell subsection 264-3, and a fourth metasurface unit cell subsection 264-4 in one embodiment. It is appreciated that this number of metasurface unit cell subsections shown in FIG. 2 is merely an example and the present specification contemplates that the metasurface unit cell array 262 may be divided into more or fewer than four metasurface unit cell subsections. The selection of the number of metasurface unit cell subsections such as 264-1, 264-2, 264-3, and 264-4 or others may be selected depending on surface area available for a metasurface unit cell array 262 as well as gain or breadth of range of the one or more directional beams 297-1, 297-2, 297-3, 297-4 or others resulting from the sub-sectioned metasurface unit cell array 262 in various embodiments herein.

As shown in FIG. 2, each of the metasurface unit cell subsections 264-1, 264-2, 264-3, 264-4 may each include a plurality of metasurface unit cells such as 266-1, 268-1, 266-2, 268-2, 266-3, 268-3, 266-4, 268-4. FIG. 2 shows, at least, a first metasurface unit cell 266-1, 266-2, 266-3, 266-4 and a second metasurface unit cell 268-1, 268-2, 268-3, 268-4 included in each of the metasurface unit cell subsections 264-1, 264-2, 264-3, 264-4. It is appreciated, however, that each of the metasurface unit cell subsections 264-1, 264-2, 264-3, 264-4 of the metasurface unit cell array 262 may include more than the first metasurface unit cell 266-1, 266-2, 266-3, 266-4 and second metasurface unit cell 268-1, 268-2, 268-3, 268-4 respectively shown in FIG. 2 and instead may include more than those shown. In an embodiment, the metasurface unit cell array 262 may include each of the metasurface unit cell subsections 264-1, 264-2, 264-3, 264-4 that includes an array of metasurface unit cells 266-1, 268-1, or others, 266-2, 268-2, or others, 266-3, 268-3, or others, and 266-4, 268-4, or others respectively arranged in rows and columns within each metasurface unit cell subsections 264-1, 264-2, 264-3, and 264-4. It is appreciated, however, that any arrangement and any number of metasurface unit cells may be used to form the plurality of subsections 264-1, 264-2, 264-3 and 264-4 or others of the metasurface unit cell array 262 described herein. As described herein, the metasurface unit cell array 262 is a static metasurface unit cell array 262 in an embodiment that does not use power to reconfigure any of the metasurface unit cells 266-1, 268-1, 266-2, 268-2, 266-3, 268-3, 266-4, 268-4. Accordingly, the formation of the individual metasurface unit cells 266-1, 268-1, 266-2, 268-2, 266-3, 268-3, 266-4, 268-4 within each of the metasurface unit cell subsections 264-1, 264-2, 264-3, 264-4 respectively are formed to create differences in the redirection phase of the EM wave to beamform the redirected EM wave in a specific beam direction 297-1, 297-2, 297-3 or 297-4 in embodiments.

Further, the selection of the number or array size of individual metasurface unit cells 266-1, 268-1, 266-2, 268-2, 266-3, 268-3, 266-4, 268-4 within each of the metasurface unit cell subsections 264-1, 264-2, 264-3, 264-4 respectively are formed to create differences in the redirection phase of the EM wave to beamform the redirected EM wave in the specific beam directions 297-1, 297-2, 297-3 or 297-4 at a specific gain magnitude. This selection of number in an array size of metasurface unit cells 266-1, 268-1, 266-2, 268-2, 266-3, 268-3, 266-4, 268-4 within each of the metasurface unit cell subsections 264-1, 264-2, 264-3, 264-4 will further depend on area available for metasurface unit cell array 262 in embodiments. Moreover, the size of each individual metasurface unit cells 266-1, 268-1, 266-2, 268-2, 266-3, 268-3, 266-4, 268-4 within each of the metasurface unit cell subsections 264-1, 264-2, 264-3, 264-4 respectively depend upon the EM wavelength or frequency of radiofrequency signal being reflected by the metasurface unit cell array 262. For example, higher frequency RF signals (e.g., 28 GHz) utilize smaller individual metasurface unit cells 266-1, 268-1, 266-2, 268-2, 266-3, 268-3, 266-4, 268-4 to enable more unit cells in a smaller space within each of the metasurface unit cell subsections 264-1, 264-2, 264-3, 264-4 respectively in an embodiment. In another example, lower frequency RF signals (e.g., 2.4 or 5 GHz) utilize larger individual metasurface unit cells 266-1, 268-1, 266-2, 268-2, 266-3, 268-3, 266-4, 268-4 and require a larger space within each of the metasurface unit cell subsections 264-1, 264-2, 264-3, 264-4 respectively to obtain a similar gain of directionality beams 297-1, 297-2, 297-3 or 297-4 in an embodiment.

Thus, in an embodiment, the first metasurface unit cell 266-1 and second metasurface unit cell 268-1 or other metasurface unit cells are formed in a first metasurface unit cell subsection 264-1 to create a specific phase shifting that redirects incoming EM waves while also increasing the gain of that EM wave using constructive and/or destructive interference principles in a first directionality beam 297-1. In an embodiment, the first metasurface unit cell 266-2 and second metasurface unit cell 268-2 or other metasurface unit cells are formed in a second metasurface unit cell subsection 264-2 to create a specific phase shifting that redirects incoming EM waves while also increasing the gain of that EM wave using constructive and/or destructive interference principles in a second directionality beam 297-2. In another embodiment, the first metasurface unit cell 266-3 and second metasurface unit cell 268-3 or other metasurface unit cells are formed in a third metasurface unit cell subsection 264-3 to create a specific phase shifting that redirects incoming EM waves while also increasing the gain of that EM wave using constructive and/or destructive interference principles in a third directionality beam 297-3. In yet another embodiment, the first metasurface unit cell 266-4 and second metasurface unit cell 268-4 or other metasurface unit cells are formed in a fourth metasurface unit cell subsection 264-4 to create a specific phase shifting that redirects incoming EM waves while also increasing the gain of that EM wave using constructive and/or destructive interference principles in a fourth directionality beam 297-4. Additional metasurface unit cell subsections (not shown) may similarly be formed in embodiments herein.

In an embodiment, each of the metasurface unit cell subsections 264-1, 264-2, 264-3, 264-4 may be separated from each other by a distance such that the redirected EM waves do not interfere with each other. In an embodiment, the metasurface unit cell subsections 264-1, 264-2, 264-3, 264-4 may be separated from each neighboring metasurface unit cell subsection 264-1, 264-2, 264-3, 264-4 by at least a distance equivalent to a length of at least one metasurface unit cell or more in an embodiment. In a further embodiment, the metasurface unit cell subsections 264-1, 264-2, 264-3, 264-4 may be separated from each neighboring metasurface unit cell subsection 264-1, 264-2, 264-3, 264-4 by at least a distance equivalent to two metasurface unit cells. As described, this separation distance may change depending on the EM wavelength or frequency of radiofrequency waves being reflected by the static metasurface unit cell arrays in embodiments herein. Thus, in an embodiment, the metasurface unit cell array 262 shown in FIG. 2 may be used to redirect a single incoming EM wave in four distinct directionality beams 297-1, 297-2,-297-3, or 297-4 without each of the beams interfering with each other.

In a specific example embodiment, the four metasurface unit cell subsections 264-1, 264-2, 264-3, 264-4 may redirect the incoming EM wave in a specific direction beam 297-1, 297-2, 297-3, or 297-4 having a directional range across one or more azimuths and a gain level, for example, at a center direction angle. For example, the first metasurface unit cell subsection 264-1 of the static metasurface unit cell array 262 may redirect the incoming EM signals or waves in a first direction beam 297-1 having a directional range along an azimuth. This creates a first redirected beam 297-1 reflected off of the metasurface unit cell array 262. Specifically, the first redirected beam 297-1 reflected off of the first metasurface unit cell subsection 264-1 may redirect the EM wave between −120° to −60° along the azimuth. As described, the azimuth may be a horizontal reference plane, a vertical reference plane, or some combination in example embodiments. In this example embodiment, the second metasurface unit cell subsection 264-2 of the metasurface unit cell array 262 may redirect the EM wave thereby creating a second redirected beam 297-2 in a second direction along an azimuth such as between −60° to 0° along the azimuth. Additionally, in this example embodiment, the third metasurface unit cell subsection 264-3 of the metasurface unit cell array 262 may redirect incoming EM wave thereby creating a third redirected beam 297-3 directed towards a third direction along the azimuth such as between 0° to 60° along the azimuth. Even further, the fourth metasurface unit cell subsection 264-4 of the metasurface unit cell array 262 may redirect incoming EM waves thereby creating a fourth redirected beam 297-4 in a fourth direction along the azimuth such as between 60° to 120° along the azimuth. Again, it is also appreciated that a vertical or elevational component of the directionality of the redirected EM wave may also be incorporated into one or more of the metasurface unit cell subsections 264-1, 264-2, 264-3, 264-4 such that the formation of the individual metasurface unit cells 266-1, 266-2, 266-3, 266-4, 268-1, 268-2, 268-3, 268-4 within each of the metasurface unit cell subsections 264-1, 264-2, 264-3, 264-4 can redirect the incoming EM waves up or down relative to the surface of the metasurface unit cell array 262.

As described herein, the presently-described static metasurface unit cell array 262 of embodiments herein provides directional signal enhancement by redirecting enhanced EM waves in a plurality of redirected beams 297-1, 297-2, 297-3, 297-4 in plural direction ranges along the azimuth without the need for electronic components or complex software algorithms. Still further, the static metasurface unit cell array 262 may be a low-cost and maintenance free solution that makes the static metasurface unit cell array 262 ideal for widespread deployment. This static metasurface unit cell array 262 may be easily integrated into existing laptop designs without significant cost or complexity thereby providing a long-term enhancement to wireless connectivity without the need for updates or active management. Still further, the static metasurface unit cell array 262 offers enhanced coexistence with passive collaboration among the information handling systems 200 so that signal strength is enhanced and network reliability for each information handling system 200 can leverage the presence of multiple laptops in order to enhance the network coverage.

Figure 3A:
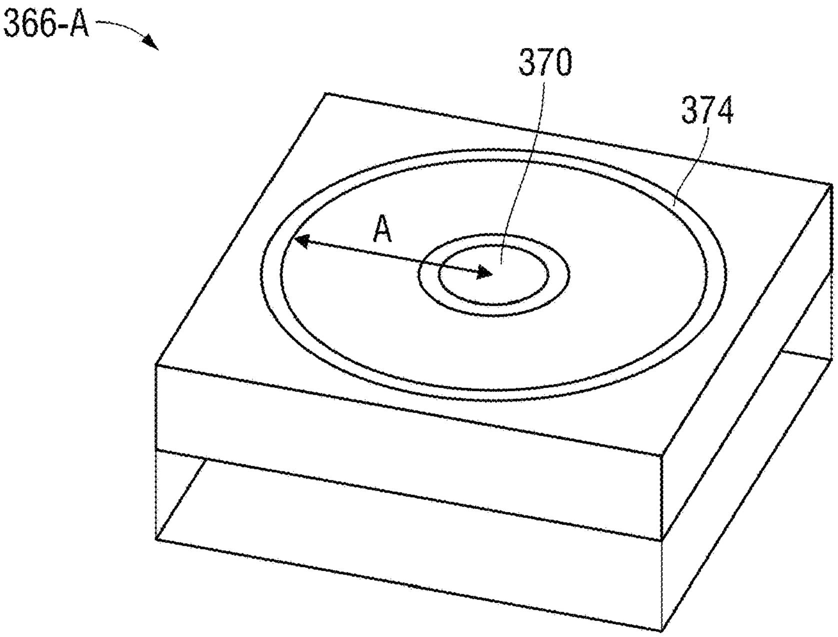
FIG. 3A is a graphic diagram of a metasurface unit cell that may be formed within the static metasurface unit cell array according to an embodiment of the present disclosure.
Figure 3B:
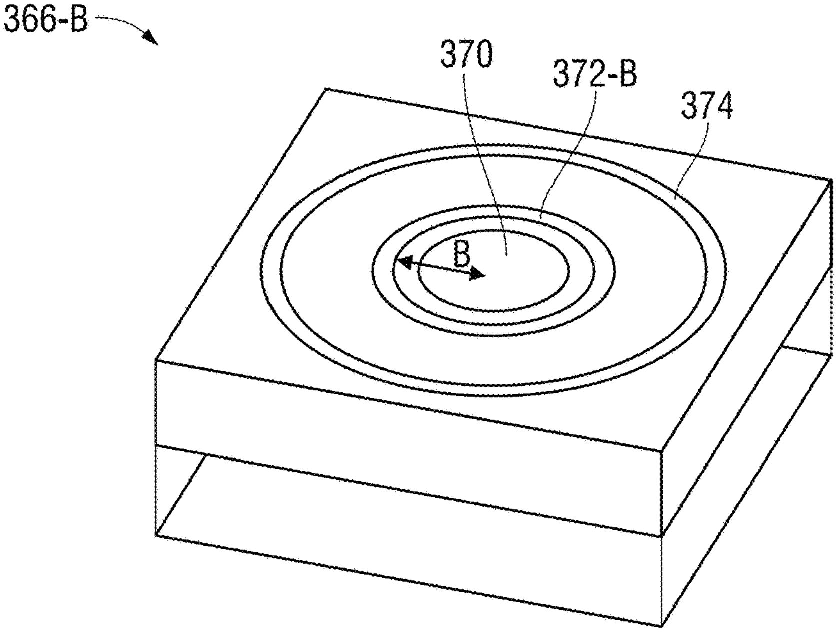
FIG. 3B is a graphic diagram of a metasurface unit cell that may be formed within the static metasurface unit cell array according to yet another embodiment of the present disclosure.
Figure 3C:
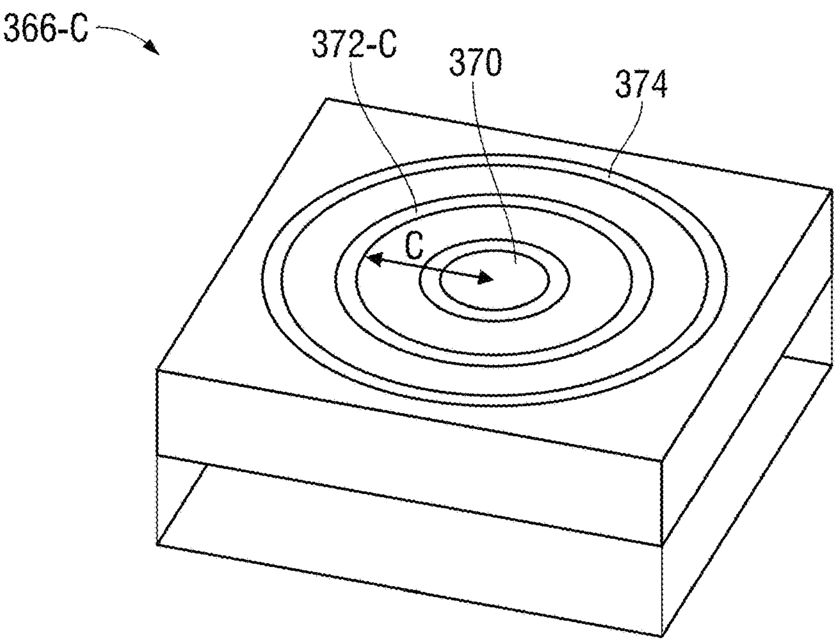
FIG. 3C is a graphic diagram of a metasurface unit cell that may be formed within the static metasurface unit cell array according to another embodiment of the present disclosure.
Figure 3D:
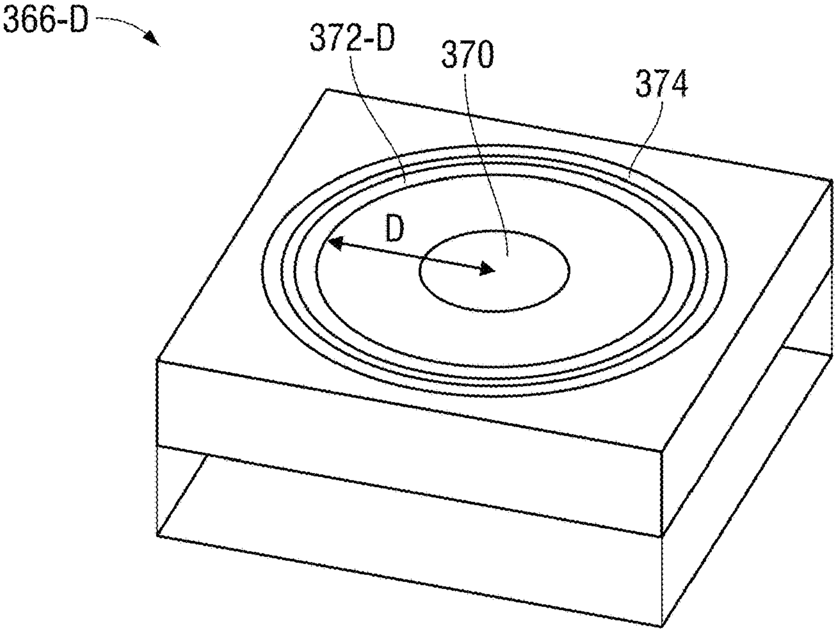
FIG. 3D is a graphic diagram of a metasurface unit cell that may be formed within the static metasurface unit cell array according to yet another embodiment of the present disclosure.

FIG. 3A is a graphic diagram of a unit cell 366-A within the static metasurface unit cell array according to an embodiment of the present disclosure. Additionally, FIGS. 3B-3D are also graphic diagrams of other static unit cells 366-B, 366-C, and 366-D that may be used within a static metasurface unit cell array or subsections thereof according to other embodiments of the present disclosure. The unit cells 366-A, 366-B, 366-C, and 366-D shown in FIGS. 3A-3D show different configurations which may include a first metallic concentric ring such as 372-B, 372-C, and 372-D (or no first metallic concentric ring as in FIG. 3A) and second metallic concentric ring 374 relative to an inner metallic dot or node 370. As described herein, these static unit cells 366-A, 366-B, 366-C, and 366-D may be formed to create a specific phase shifting that, as part of a group of unit cells within any given metasurface unit cell subsection, redirects incoming EM waves and may determine the gain of that EM wave using constructive and/or destructive interference principles in each redirected directionality beam as described in embodiments herein. Each metasurface unit cell subsection may include a variety of the metasurface unit cells such as those shown at 366-A, 366-B, 366-C, or 366-D in FIGS. 3A-3D or others with varying configurations of metallic concentric rings to generate a phase shifting between and among the metasurface unit cells across each metasurface unit cell array subsection to generate a directionality beam of redirected EM waves for the radiofrequency signals. It is appreciated that other types of metasurface unit cells may be used to form the individual metasurface unit cell subsections of the metasurface unit cell array than those shown in FIGS. 3A-3D. Thus, those metasurface unit cells 366-A, 366-B, 366-C, and 366-D shown and described in connection with FIGS. 3A-3D are merely examples and the present specification contemplates that other types of static metasurface unit cells may be used to form the metasurface unit cell subsections as described herein.

FIG. 3A shows a first example of a second metallic concentric ring 374 relative to the central inner metallic dot 370 of the static metasurface unit cell 366-A. Each of the inner metallic dot 370 and the second metallic concentric ring 374 may act as a specific resonating element within the metasurface unit cell 366-A that causes a phase shift of the incoming EM wave such that, through constructive and/or destructive interference with other metasurface unit cells in a metasurface unit cell array subsection creates the directionality beam of the redirected EM wave. As shown in FIG. 3A, the distance "A" between the inner metallic dot 370 and the second metallic concentric ring 374 may be 3.0 mm, however dimensions may depend upon the EM wave wavelengths and frequencies being redirected and reflected in various embodiments herein. This dimension is such that this arrangement creates a specific static phase shift profile that may be used to contribute to the reflection and redirection of incoming EM waves across plural metasurface unit cells in a metasurface unit cell subsection.

FIG. 3B shows a second example of the orientation of a first metallic concentric ring 372-B and second metallic concentric ring 374 relative to the central inner metallic dot 370 of the unit cell 366-B. Each of the inner metallic dot 370, the first metallic concentric ring 372-B, and the second metallic concentric ring 374 may act as a specific resonating element within the metasurface unit cell 366-B that causes a phase shift of the incoming EM wave such that, through constructive and/or destructive interference creates the directionality of the redirected EM wave. As shown in FIG. 3B, the distance "B" between the inner metallic dot 370 and the first metallic concentric ring 372-B is relatively smaller than that shown in FIG. 3C (i.e., 372-C) and D (i.e., 372-D) such that the first metallic concentric ring 372-B is closer to the inner metallic dot 370. This distance "B", in an embodiment, may be 1.00 mm, however dimensions may depend upon the EM wave wavelengths and frequencies being redirected and reflected in various embodiments herein. This arrangement creates a specific static phase shift profile that may be used to contribute to the reflection and redirection of incoming EM waves across plural metasurface unit cells in a metasurface unit cell subsection due to constructive or destructive interference among unit cells.

FIG. 3C shows a third example of the orientation of the first metallic concentric ring 372-C and second metallic concentric ring 374 relative to the central inner metallic dot 370 of the unit cell 366-C. Again, each of the inner metallic dot 370, the first metallic concentric ring 372-C, and the second metallic concentric ring 374 may act as a specific resonating element within the metasurface unit cell 366-C that causes a phase shift of the incoming EM wave such that, through constructive and/or destructive interference creates the directionality of the redirected EM wave. As shown in FIG. 3C, the distance "C" between the inner metallic dot 370 and the first metallic concentric ring 372-C is relatively larger than that shown in FIG. 3B for 372-B such that the first metallic concentric ring 372-C is placed about midway between the second metallic concentric ring 374 and the inner metallic dot 370. This distance "C", in an embodiment, may be 1.50 mm, however dimensions may depend upon the EM wave wavelengths and frequencies being redirected and reflected in various embodiments herein. This arrangement creates a specific static phase shift profile that may be used to contribute to the reflection and redirection of incoming EM waves across plural metasurface unit cells in a metasurface unit cell subsection due to constructive or destructive interference among unit cells.

FIG. 3D shows a fourth example of the orientation of the first metallic concentric ring 372-D and second metallic concentric ring 374 relative to the central inner metallic dot 370 of the unit cell 366-D. Again, each of the inner metallic dot 370, the first metallic concentric ring 372-D, and the second metallic concentric ring 374 may act as a specific resonating element within the metasurface unit cell 366-D that causes a phase shift of the incoming EM wave such that, through constructive and/or destructive interference creates the directionality of the redirected EM wave. As shown in FIG. 3D, the distance "D" between the inner metallic dot 370 and the first metallic concentric ring 372-D is relatively larger than that shown in FIG. 3C for 372-C such that the first metallic concentric ring 372-D is placed closer to the second metallic concentric ring 374 than the inner metallic dot 370. This distance "D", in an embodiment, may be 2.00 mm, however dimensions may depend upon the EM wave wavelengths and frequencies being redirected and reflected in various embodiments herein. This arrangement creates a specific static phase shift profile that may be used to contribute to the reflection and redirection of incoming EM waves across plural metasurface unit cells in a metasurface unit cell subsection due to constructive or destructive interference among unit cells.

Figure 4:
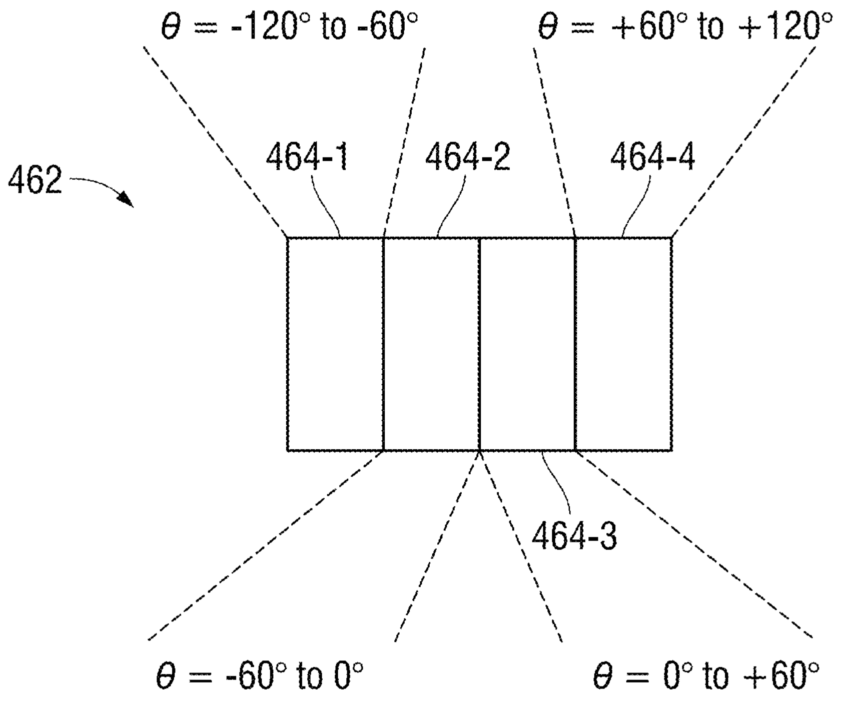
FIG. 4 is a block diagram illustrating a metasurface unit cell array being separated into individual subsection slices used to redirect incoming electromagnetic waves along the azimuth according to an embodiment of the present disclosure.

FIG. 4 is a block diagram illustrating a metasurface unit cell array 462 separated into individual slices or metasurface unit cell subsections 464-1, 464-2, 464-3, 464-4 used to redirect incoming electromagnetic waves along an azimuth according to an embodiment of the present disclosure. Again, it is appreciated that a vertical or elevational component or other angular direction component of the directionality of the redirected EM wave may also be incorporated into one or more of the metasurface unit cell subsections 464-1, 464-2, 464-3, 464-4 in other embodiments such that the formation of the individual metasurface unit cells within each of the metasurface unit cell subsections 464-1, 464-2, 464-3, 464-4 can redirect the incoming EM waves up, down, some combination, or any variety of directions relative to the surface of the metasurface unit cell array 462.

As shown in FIG. 4, the metasurface unit cells of the first metasurface unit cell subsection 464-1 may be configured to redirect an incoming EM wave in a first direction. Specifically, the first metasurface unit cell subsection 464-1 may redirect the EM wave between −120° to −60° along the azimuth that is, for example, a horizontal azimuth reference relative to the page. In this example embodiment, the second metasurface unit cell subsection 464-2 of the metasurface unit cell array 462 may redirect the EM wave in a second direction along an azimuth such as between −60° to 0° along the azimuth. Additionally, in this example embodiment, the third metasurface unit cell subsection 464-3 of the metasurface unit cell array 462 may redirect incoming EM waves in a third direction along the azimuth such as between 0° to 60° along the azimuth. Even further, the fourth metasurface unit cell subsection 464-4 of the metasurface unit cell array 462 may redirect incoming EM waves in a fourth direction along the azimuth such as between 60° to 120° along the azimuth.

Figure 5:
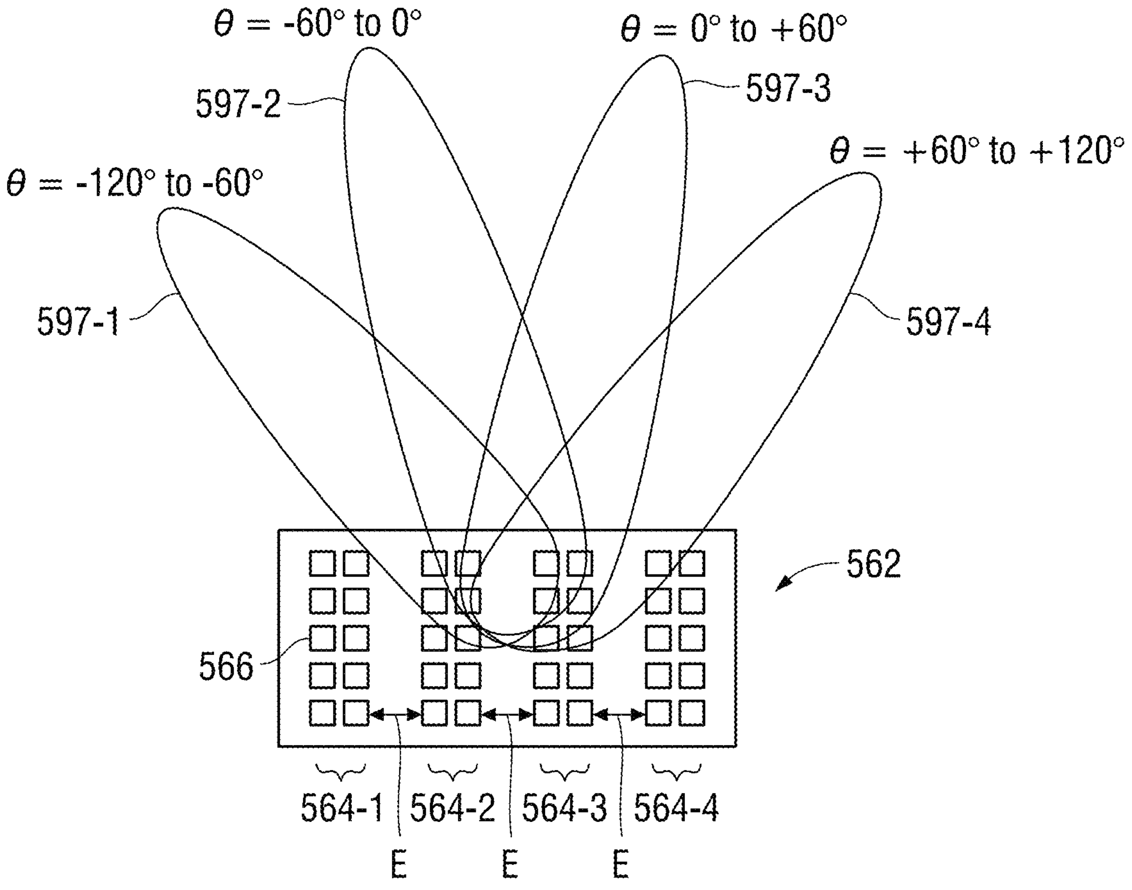
FIG. 5 is a block and graphic diagram illustrating a metasurface unit cell array with individual subsection slices operating to redirect incoming electromagnetic waves along the azimuth according to an embodiment of the present disclosure.

FIG. 5 is block and graphic diagram illustrating a metasurface unit cell array 562 operating to redirect incoming electromagnetic waves along an azimuth according to an embodiment of the present disclosure. Again, the metasurface unit cell array 562 may include a plurality of metasurface unit cells 566 that have been divided into, in this example embodiment, a first metasurface unit cell subsection 564-1, a second metasurface unit cell subsection 564-2, a third metasurface unit cell subsection 564-3, and a fourth metasurface unit cell subsection 564-4.

In this specific example embodiment, the four metasurface unit cell subsections 564-1, 564-2, 564-3 and 564-4 may redirect the incoming EM wave in a specific direction or directional range. For example, the first metasurface unit cell subsection 564-1 of the static metasurface unit cell array 562 may redirect the incoming EM signals or waves in a first direction beam 597-1 with a directional range along an azimuth. This creates a first redirected beam 597-1 reflected off of the metasurface unit cell array 562. Specifically, the first redirected beam 597-1 reflected off of the first metasurface unit cell subsection may redirect the EM wave in a range between −120° to −60° along the azimuth. In this example embodiment, the second metasurface unit cell subsection 564-2 of the metasurface unit cell array 562 may redirect the EM wave thereby creating a second redirected beam 597-2 in a second direction along an azimuth such as between −60° to 0° along the azimuth. Additionally, in this example embodiment, the third metasurface unit cell subsection 564-3 of the metasurface unit cell array 562 may redirect incoming EM wave thereby creating a third redirected beam 597-3 directed towards a third direction along the azimuth such as between 0° to 60° along the azimuth. Even further, the fourth metasurface unit cell subsection 564-4 of the metasurface unit cell array 562 may redirect incoming EM waves thereby creating a fourth redirected beam 597-4 in a fourth direction along the azimuth such as between 60° to 120° along the azimuth.

Although each metasurface unit cell subsection 564-1, 564-2, 564-3 and 564-4 is shown with an array of five by two metasurface unit cells 566, it is contemplated that each metasurface unit cell subsection 564-1, 564-2, 564-3 and 564-4 may have any number of unit cells 566 including differing numbers of units cells in various embodiments herein. Further, each metasurface unit cell subsection 564-1, 564-2, 564-3 and 564-4 is shown with an array of metasurface unit cells that are spaced from other metasurface unit cell subsections 564-1, 564-2, 564-3 and 564-4 across the metasurface unit cell array 562 according to embodiments herein.

Figure 6:
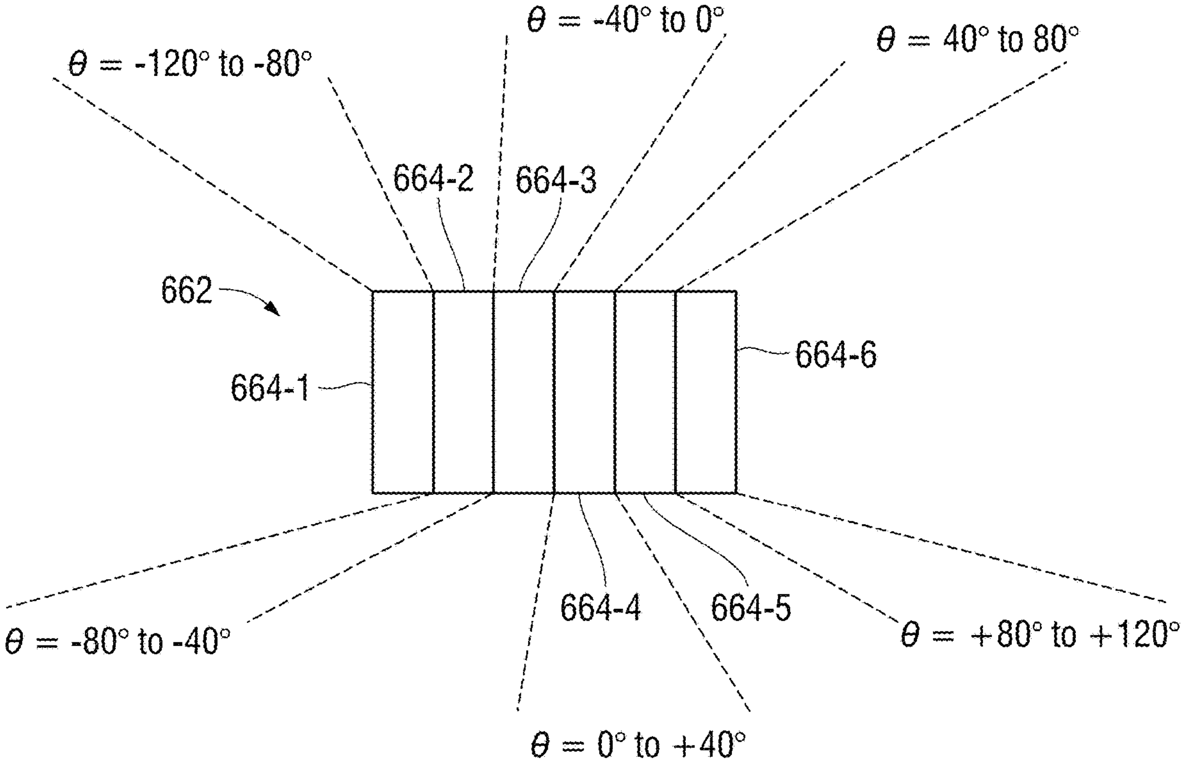
FIG. 6 is a block diagram illustrating a metasurface unit cell array being separated into individual subsection slices used to redirect incoming electromagnetic waves along an azimuth according to another embodiment of the present disclosure.

FIG. 6 is a block diagram illustrating a metasurface unit cell array 662 separated into individual slices or subsections used to redirect incoming electromagnetic waves along the azimuth according to another embodiment of the present disclosure. As described herein, the metasurface unit cell array 662 may be segregated or divided into more or fewer than the four metasurface unit cell subsections shown in FIG. 4. In this example embodiment shown in FIG. 6, the metasurface unit cell array 662 has been separated into six metasurface unit cell subsections 664-1, 664-2, 664-3, 664-4, 664-5, and 664-6 forming six direction beams across six angle ranges across an azimuth. In the example embodiment shown, the azimuth is shown as a horizontal azimuth from the page, but any azimuth reference plane is contemplated as described in embodiments herein and each metasurface unit cell array subsection 664-1, 664-2, 664-3, 664-4, 664-5, and 664-6 may have a horizontal, vertical, or blended azimuth or each may have different azimuth base planes such that any variety of vertical, horizontal, or blended redirected direction beams may be formed.

Thus, as shown in FIG. 6, the metasurface unit cells of the first metasurface unit cell subsection 664-1 may be configured to redirect an incoming EM wave in a first direction. Specifically, the first metasurface unit cell subsection 664-1 may redirect the EM wave between −120° to −80° along an azimuth. In this example embodiment, the second metasurface unit cell subsection 664-2 of the metasurface unit cell array 662 may redirect the EM wave in a second direction along an azimuth such as between −80° to −40° along the azimuth. Additionally, in this example embodiment, the third metasurface unit cell subsection 664-3 of the metasurface unit cell array 662 may redirect incoming EM waves in a third direction along the azimuth such as between −40° to 0° along the azimuth. Even further, the fourth metasurface unit cell subsection 664-4 of the metasurface unit cell array 662 may redirect incoming EM waves in a fourth direction along the azimuth such as between 0° to 40° along the azimuth. Still further, the fifth metasurface unit cell subsection 664-5 of the metasurface unit cell array 662 may redirect incoming EM waves in a fifth direction along the azimuth such as between 40° to 80° along the azimuth. Additionally, the sixth metasurface unit cell subsection 664-6 of the metasurface unit cell array 662 may redirect incoming EM waves in a sixth direction along the azimuth such as between 80° to 120° along the azimuth.

Figure 7:
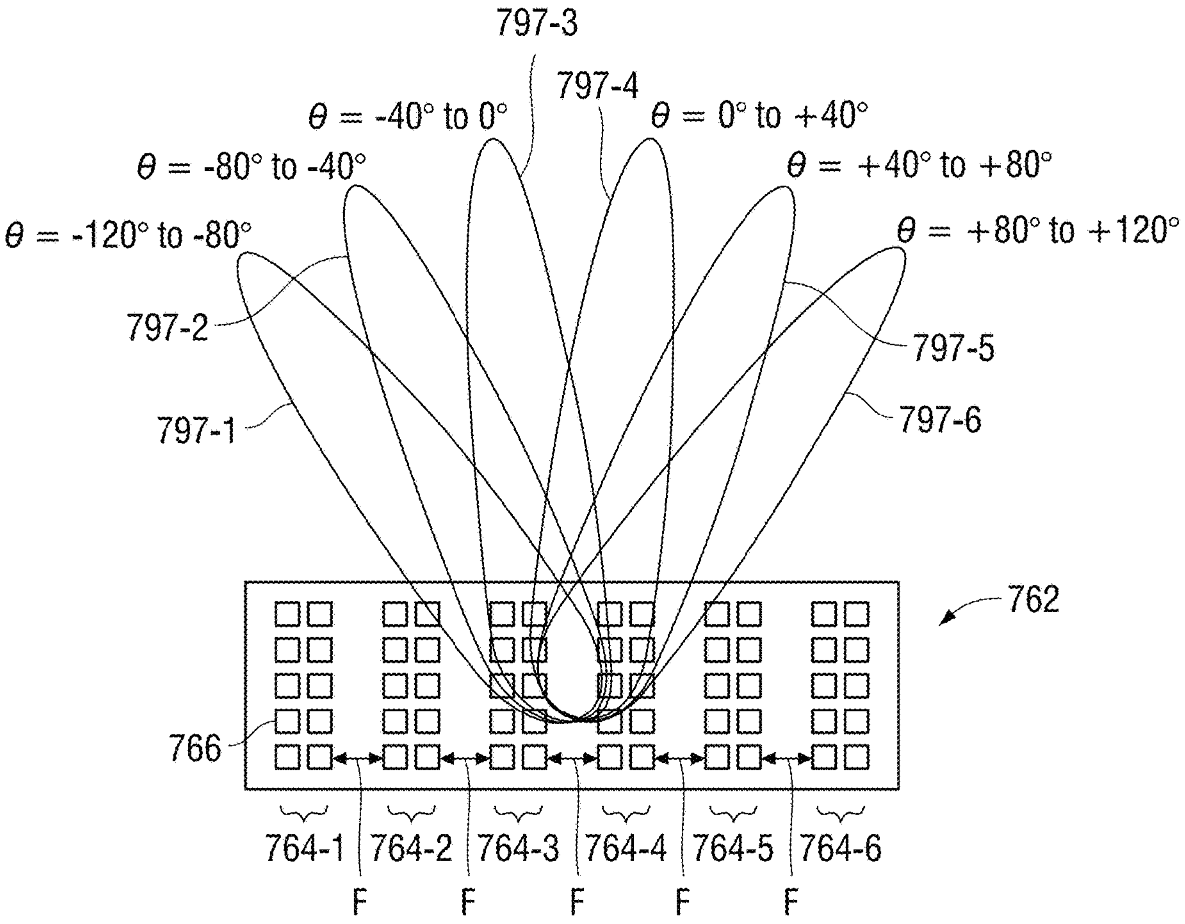
FIG. 7 is a block and graphic diagram illustrating a metasurface unit cell array with individual subsection slices operating to redirect incoming electromagnetic waves along the azimuth according to another embodiment of the present disclosure.

FIG. 7 is block and graphic diagram illustrating a metasurface unit cell array operating to redirect incoming electromagnetic waves along an azimuth according to another embodiment of the present disclosure. Again, the metasurface unit cell array 762 may include a plurality of metasurface unit cells 766 that have been divided into, in this example embodiment, a first metasurface unit cell subsection 764-1, a second metasurface unit cell subsection 764-2, a third metasurface unit cell subsection 764-3, a fourth metasurface unit cell subsection 764-4, a fifth metasurface unit cell subsection 764-5, and a sixth metasurface unit cell subsection 764-6.

Thus, in this specific example embodiment, the six metasurface unit cell subsections 764-1, 764-2, 764-3, 764-4, 764-5, and 764-6 may redirect the incoming EM wave in a specific direction 797-1, 797-2, 797-3, 797-4, 797-5 or 797-6 having a specific directional range. For example, the first metasurface unit cell subsection 764-1 of the static metasurface unit cell array 762 may redirect the incoming EM signals or waves in a first direction beam 797-1 having a first directional range along an azimuth. This creates a first redirected beam 797-1 reflected off of the metasurface unit cell array 762. Specifically, the first redirected beam 797-1 reflected off of the first metasurface unit cell subsection may redirect the EM wave between −120° to −80° along the azimuth. In this example embodiment, the second metasurface unit cell subsection 764-2 of the metasurface unit cell array 762 may redirect the EM wave thereby creating a second redirected beam 797-2 in a second direction along an azimuth such as between −80° to −40° along the azimuth. Additionally, in this example embodiment, the third metasurface unit cell subsection 764-3 of the metasurface unit cell array 762 may redirect incoming EM wave thereby creating a third redirected beam 797-3 directed towards a third direction along the azimuth such as between −40° to 0° along the azimuth. Even further, the fourth metasurface unit cell subsection 764-4 of the metasurface unit cell array 762 may redirect incoming EM waves thereby creating a fourth redirected beam 797-4 in a fourth direction along the azimuth such as between 0° to 40° along the azimuth. Still further, the fifth metasurface unit cell subsection 764-5 of the metasurface unit cell array 762 may redirect incoming EM waves thereby creating a fifth redirected beam 797-5 in a fifth direction along the azimuth such as between 40° to 80° along the azimuth. Even further, the sixth metasurface unit cell subsection 764-6 of the metasurface unit cell array 762 may redirect incoming EM waves thereby creating a sixth redirected beam 797-6 in a sixth direction along the azimuth such as between 80° to 120° along the azimuth.

Although each metasurface unit cell subsection 764-1, 764-2, 764-3, 764-4, 764-5, and 764-6 is shown with an array of five by two metasurface unit cells 766, it is contemplated that each metasurface unit cell subsection 764-1, 764-2, 764-3, 764-4, 764-5, and 764-6 may have any number of unit cells 766 including differing numbers of units cells in various embodiments herein. Further, each metasurface unit cell subsection 764-1, 764-2, 764-3, 764-4, 764-5, and 764-6 is shown with an array of metasurface unit cells that are spaced from other metasurface unit cell subsections 764-1, 764-2, 764-3, 764-4, 764-5, and 764-6 across the metasurface unit cell array 762 according to embodiments herein.

Figure 8:
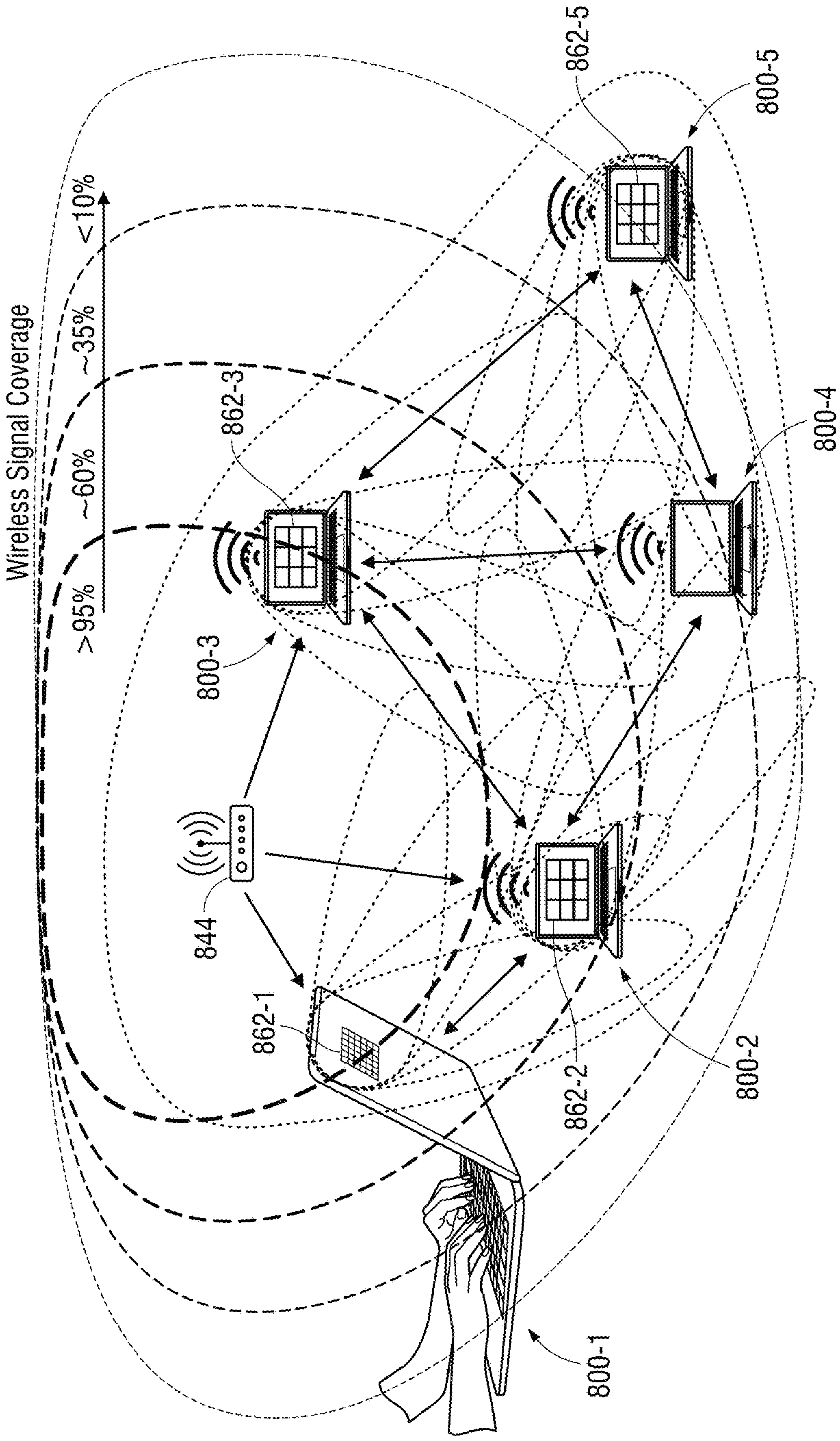
FIG. 8 is a graphic diagram illustrating an increase in EM wave coverage via use of a plurality of information handling systems and associated metasurface unit cell arrays having individual subsection slices coupled to some of the plurality of information handling systems according to an embodiment of the present disclosure.

FIG. 8 graphic diagram illustrating an increase in EM wave coverage via use of a plurality of information handling systems 800-1, 800-2, 800-3, 800-4, 800-5 and associated metasurface unit cell arrays 862-1, 862-2, 862-3, 862-5 coupled to some of the plurality of information handling systems 800-1, 800-2, 800-3, 800-4, 800-5 according to an embodiment of the present disclosure. In an embodiment, an access point 844 is shown to emit a wireless communication radiofrequency signals to an area in which the plurality of information handling systems 800-1, 800-2, 800-3, 800-4, 800-5 are located. However, not all of the information handling systems 800-1, 800-2, 800-3, 800-4, 800-5 are within an acceptable wireless range from the access point 844 for wireless communication. As described herein, the metasurface unit cell arrays 862-1, 862-2, 862-3, 862-5 may be used to increase the wireless range of the access point 844 by redirecting, extending, and enhancing, through increased gain, those wireless signals emitted from the access point 844.

FIG. 8 shows a first information handling system 800-1 that has a first metasurface unit cell array 862-1 operatively to the lid of the first information handling system 800-1. As described herein, the first metasurface unit cell array 862-1 may redirect the incoming EM waves that form the wireless signal from the access point 844 in four different directions as described herein. This redirection of the EM waves as well as increases the gain of the plurality of directional beams thereby increases the distance from the access point 844 that the wireless signal may reach. Indeed, one of the redirected beams from the first metasurface unit cell array 862-1 may reach a second information handling system 800-2. This allows the second information handling system 800-2 to receive a better wireless signal than would otherwise be realized without the use of the first metasurface unit cell array 862-1 at the first information handling system 800-1. Still further, the second information handling system 800-2 may also include its own second metasurface unit cell array 862-2 to further redirect received radiofrequency signals.

This second metasurface unit cell array 862-2 may also redirect the wireless signal redirected from the first metasurface unit cell array 862-1 or received from access point 844 to other information handling systems 800-1, 800-2, 800-3, 800-4, 800-5 within the area. Again, where the second metasurface unit cell array 862-2 is divided into four metasurface unit cell subsections, four directional wireless beams may also be created for other information handling systems 800-1, 800-2, 800-3, 800-4, 800-5 to receive. This further increases the wireless range of the wireless signal originating from the access point 844 relative to the range available without the first or second metasurface unit cell arrays 862-1 and 862-2.

Similar situations occur with the third information handling system 800-3 and the fifth information handling system 800-5 shown in FIG. 8. Indeed, because the third information handling system 800-3 and fifth information handling system 800-5 each include a third metasurface unit cell array 862-3 and a fifth metasurface unit cell array 862-5, respectively, the wireless signal from the access point 844 may be relayed thereby increasing the wireless range of the access point 844 within the area relative to the range available without the first, second, third, or fifth metasurface unit cell arrays 862-1, 862-2, 862-3 and 862-5 in embodiments herein. Indeed, information handling systems 800-4 and 800-5 may have been outside an acceptable RSSI signal level range from access point 844 without the without the first, second, third, or fifth metasurface unit cell arrays 862-1, 862-2, 862-3 and 862-5. For example, without the first, second, third, or fifth metasurface unit cell arrays 862-1, 862-2, 862-3 and 862-5, information handling system 800-5 may have had <10% wireless signal coverage and information handling system 800-4 may have had about 35% or less wireless signal coverage. However, directional beam lobes from a subsection of metasurface unit cell array 862-3 may provide a directed beam towards information handling system 800-5 in the radiofrequency area for sufficient wireless signal in an embodiment. Similarly, directional beam lobes from a subsections of metasurface unit cell arrays 862-2, 862-3 or 863-5 may provide one or more directed beams towards information handling system 800-4 in the radiofrequency area for sufficient wireless signal in another embodiment.

In an example embodiment of FIG. 8, the fourth information handling systems 800-4, unlike the other information handling systems 800-1, 800-2, 800-3, 800-5, does not include a metasurface unit cell array. However, because the fourth information handling system 800-4 is within range of those redirected beams from, for example, the second metasurface unit cell array 862-2, the fourth information handling system 800-4 may be capable of wireless transceiving data to and from the access point 844 as a result of the operations of those metasurface unit cell arrays present within the wireless network. The second metasurface unit cell array 862-2 may redirect wireless signal received from a wireless signal redirected in one directionality lobe direction from the first metasurface unit cell array 862-1 or a diminished wireless signal (e.g., at 60%) directly from the access point 844 in some embodiments. It is appreciated that although some of the information handling systems 800-1, 800-2, 800-3, 800-4, 800-5 include a metasurface unit cell array 862-1, 862-2, 862-3, 862-5, each information handling system 800-1, 800-2, 800-3, 800-4, 800-5 may receive transmissions from the access point 844 via greater and extended coverage due to the metasurface unit cell arrays 862-1, 862-2, 862-3, 862-5 in the radiofrequency environment. The respective metasurface unit cell arrays 862-1, 862-2, 862-3, 862-5 redirect the wireless signals from the access point 844 in the radiofrequency area among the information handling systems 800-1, 800-2, 800-3, 800-4, 800-5 for extended range in embodiments herein.

Figure 9:
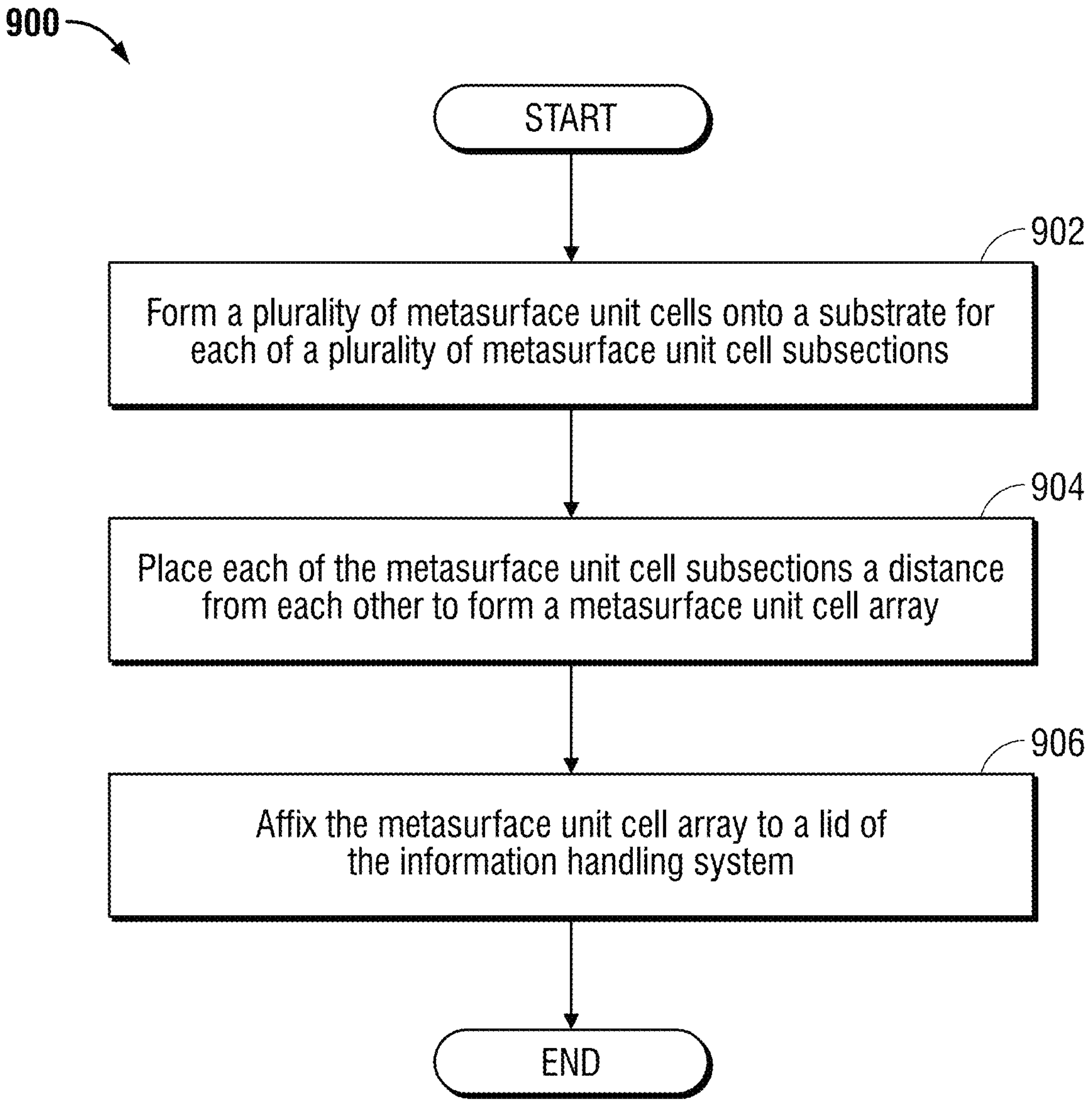
FIG. 9 is a flow diagram of a method of manufacturing a metasurface unit cell array with individual subsection slices according to an embodiment of the present disclosure.

FIG. 9 is a flow diagram of a method of manufacturing a metasurface unit cell array according to an embodiment of the present disclosure. As described herein, the metasurface may be a static metasurface unit cell array that does not require power to operate.

Thus, at block 902, the method 900 may include metasurface unit cells onto a substrate for each of a plurality of metasurface unit cell subsections. This may include selecting an appropriate design of each individual metasurface unit cell and layout of plural metasurface unit cells across each subsection of a metasurface unit cell array as described in connection with FIGS. 3A-3D such that a specific phase shifting pattern may be achieved across each subsection to achieve directional beam lobes of reflected radiofrequency signals. Indeed, the selection of the design of neighboring metasurface unit cells within a subsection may be dependent on the intended direction of a beam emitted or redirected from the surface of that subsection of the metasurface unit cell array as described in connection with, for example, FIGS. 5 and 7. In an embodiment, the metasurface unit cells of the static metasurface unit cell array may each include one or more concentric metal resonators formed around a central metal dot on a substrate with the arrangement and number of concentric metal resonators define the phase shifting of the incoming EM signals by that metasurface unit cell. Although embodiments of the present disclosure show concentric circular resonators used for unit cells, any geometric shape with concentric resonator structures or non-concentric resonator structures may be used for passive unit cells and sized and arranged for reflection of particular radiofrequency signal wavelengths and to achieve particular according to other embodiments of the present disclosure. Arrangement of these different phase shifting metasurface unit cells relative to one another in subsection a metasurface unit cell array may determine constructive or destructive interactions of reflected EM signals to redirect the EM signals in the first direction beam, the second direction beam, the third direction beam, the fourth direction beam or others depending on the number of subsections. The size and dimensions of each of the metasurface unit cells used and concentric resonator structures arranged therein may depend on the wavelength or frequency of the radiofrequency signal being reflected and phase shift needed at that unit cell according to embodiments herein. The wavelength of reflected radiofrequency signals and an available area for a metasurface unit cell array subsection may also determine the number of metasurface unit cells arranged in each subsection according to embodiments herein.

At block 904, the method 900 may include forming each of the metasurface unit cell subsections with arrangement of unit cells as described next to each other at a specific distance apart from one another to form a completed metasurface unit cell array. As described herein, in an embodiment, a distance between each of the subsections of neighboring metasurface unit cells may be created such that this distance is at least a length of two metasurface unit cells within the static metasurface unit cell array to avoid interference between directionality beams formed by each subsection. Forming each metasurface unit cell subsections, each with a plurality of unit cells, may be formed by deposition of conductive resonating structures as described in embodiments herein on a substrate material that is non-conductive.

Once the metasurface unit cell array is manufactured, the metasurface unit cell array may be affixed to a lid of the information handling system at block 906. In some embodiments, the metasurface unit cell array may be glued, snap-fit, or attached via fasteners to the top lid surface of a display chassis of an information handling system. In other embodiments, the metasurface unit cell array may be embedded into or deposited onto a non-conductive portion of the lid of the information handling system. As described herein, the lid of the information handling system may be an optimal location for placement of the metasurface unit cell array such that redirected EM waves may be redirected away from the information handling system in the plurality of directional beams and used by other devices within a wireless network of a radiofrequency area served by an access point. Arrangement of one or more information handling systems with metasurface unit cell arrays having plural subsections with plural directionality beams may then be deployed within a radiofrequency area to extend and enhance reach of radiofrequency signals to and from an access point beyond the reach and signal levels available from the access point without those one or more sub-sectioned metasurface unit cell arrays in embodiments herein. At this point, the method 900 may end.

The processes or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:

a processor, a memory, a display, and a power source;

a static metasurface unit cell array having a plurality of subsections of unit cells operatively coupled to a surface of the information handling system including:

a first subsection of metasurface unit cells of the static metasurface unit cell array to redirect incoming electromagnetic (EM) signals in a first direction beam along an azimuth of the static metasurface unit cell array;

a second subsection of metasurface unit cells of the static metasurface unit cell array to redirect the incoming EM signals in a second direction beam along the azimuth of the static metasurface unit cell array; and a third subsection of metasurface unit cells of the static metasurface unit cell array to redirect the incoming EM signals in a third direction beam along the azimuth of the static metasurface unit cell array, wherein the static metasurface unit cell array having the plurality of subsections of unit cells receives the incoming EM signals from an access point in a radiofrequency area to redirect those incoming EM signals in a plurality of directions of the first direction beam, the second direction beam and the third direction beam within the radiofrequency area.

2. The information handling system of claim 1 further comprising:

the first subsection of the metasurface unit cells of the static metasurface unit cell array to redirect the incoming EM signals in the first direction beam between −120° to −60° along the azimuth from a surface of the static metasurface unit cell array.

3. The information handling system of claim 1 further comprising:

the second subsection of the metasurface unit cells of the static metasurface unit cell array to redirect the incoming EM signals in the second direction beam between −60° to 0° along the azimuth from a surface of the static metasurface unit cell array.

4. The information handling system of claim 1 further comprising:

the third subsection of the metasurface unit cells of the static metasurface unit cell array to redirect the incoming EM signals in a third direction beam between 0° to 60° along the azimuth from a surface of the static metasurface unit cell array.

5. The information handling system of claim 1 further comprising:

a fourth subsection of metasurface unit cells of the static metasurface unit cell array to redirect the incoming EM signals in a fourth direction beam along the azimuth of the static metasurface unit cell array; and the fourth subsection of the metasurface unit cells of the static metasurface unit cell array to redirect the incoming EM signals in the fourth direction beam between 60° to 120° along the azimuth from a surface of the static metasurface unit cell array.

6. The information handling system of claim 1 further comprising:

the metasurface unit cells of the static metasurface unit cell array each including at least one concentric metal resonator formed around a central metal node to provide an EM signal phase shift from that metasurface unit cell with the arrangement and number of concentric metal resonators defining the EM signal phase shifting of the incoming EM signals.

7. The information handling system of claim 1, wherein the arrangement of the metasurface unit cells having varied EM signal phase shifting within each of the first subsection, the second subsection, and the third subsection determines constructive or destructive interference to generate the first direction beam, the second direction beam, and the third direction beam for redirecting the incoming EM signals by the first subsection, the second subsection, and the third subsection respectively.

8. The information handling system of claim 1, wherein a neighboring distance between each of the first subsection, the second subsection, and the third subsection of the metasurface unit cells is at least a length equivalent to one metasurface unit cell.

9. The information handling system of claim 1 further comprising:

each of the first subsection of metasurface unit cells, the second subsection of metasurface unit cells, the third subsection of metasurface unit cells redirects the incoming EM signals in a vertical direction as well as a horizontal direction relative to the azimuth.

10. A metasurface unit cell array comprising:

a first subsection of metasurface unit cells of the metasurface unit cell array to redirect incoming electromagnetic (EM) signals in a first direction beam along an azimuth from a surface of the metasurface unit cell array, wherein the arrangement of the metasurface unit cells having varied EM signal phase shifting within the first subsection determines constructive or destructive interference to generate the first direction beam for redirecting the incoming EM signals by the first subsection;

a second subsection of metasurface unit cells of the metasurface unit cell array to redirect the incoming EM signals in a second direction beam along the azimuth, wherein the arrangement of the metasurface unit cells having varied EM signal phase shifting within the second subsection, determines constructive or destructive interference to generate the second direction beam for redirecting the incoming EM signals by the second subsection; and a third subsection of metasurface unit cells of the metasurface unit cell array to redirect incoming EM signals in a third direction beam along the azimuth, wherein the arrangement of the metasurface unit cells having varied EM signal phase shifting within the third subsection determines constructive or destructive interference to generate the third direction beam for redirecting the incoming EM signals by the third subsection.

11. The metasurface unit cell array of claim 10 further comprising:

the first subsection of the metasurface unit cells of the metasurface unit cell array to redirect the incoming EM signals of the first direction beam in a first direction angular range from the azimuth of a surface of the static metasurface unit cell array; and the second subsection of the metasurface unit cells of the metasurface unit cell array to redirect the incoming EM signals of the second direction beam in a second direction angular range from the azimuth of a surface of the static metasurface unit cell array.

12. The metasurface unit cell array of claim 10 further comprising:

the metasurface unit cells of the static metasurface unit cell array each including at least one concentric metal resonator formed around a central metal node to provide the EM signal phase shifting from that metasurface unit cell with the arrangement and number of concentric metal resonators defining the EM signal phase shifting of the incoming EM signals.

13. The metasurface unit cell array of claim 10 further comprising:

a fourth subsection of metasurface unit cells of the metasurface unit cell array to redirect incoming EM signals in a fourth direction beam along the azimuth, wherein the arrangement of the metasurface unit cells having varied EM signal phase shifting within the fourth subsection determines constructive or destructive interference to generate the fourth direction beam for redirecting the incoming EM signals by the fourth subsection.

14. The metasurface unit cell array of claim 10, wherein a neighboring distance between each of the first subsection, the second subsection, and the third subsection of the metasurface unit cells is at least a length equivalent to two metasurface unit cells.

15. An information handling system comprising:

a processor, a memory, a display, and a power source, wherein the display is housed in a display chassis of the information handling system having an outer lid surface;

a static metasurface unit cell array having a plurality of subsections of unit cells operatively coupled to the outer lid surface of the information handling system, wherein each subsection of metasurface unit cells of the static metasurface unit cell array redirects incoming electromagnetic (EM) signals in a corresponding plurality of direction beams along an azimuth of the static metasurface unit cell array; and the static metasurface unit cell array having the plurality of subsections of unit cells receives the incoming EM signals from an access point in a radiofrequency area to redirect those incoming EM signals in a plurality of directions of the corresponding plurality of direction beams to extend the wireless signal coverage of the access point within the radiofrequency area.

16. The information handling system of claim 15, wherein the plurality of subsections of unit cells of the static metasurface unit cell array is at least four subsections of unit cells having at least four corresponding plurality of direction beams having at least four different directions into the radiofrequency area of the information handling system and the access point.

17. The information handling system of claim 15, wherein the plurality of subsections of unit cells of the static metasurface unit cell array is fewer than or equal to six subsections of unit cells having six or fewer corresponding plurality of direction beams with different directions into the radiofrequency area of the information handling system and the access point.

18. The information handling system of claim 16, wherein a distance gap between neighboring subsections of the plurality of subsections of the metasurface unit cells is at least a equivalent to the length of two metasurface unit cells.

19. The information handling system of claim 15, wherein the plurality of directions of the corresponding plurality of direction beams include a horizontal direction components and a vertical direction component.

20. The information handling system of claim 15 further comprising:

the metasurface unit cell array comprising a non-metal substrate onto which the plurality of subsections of metasurface unit cells are formed and which is operatively coupled to the outer lid surface of the information handling system.

* * * * *